Jan. 15, 1935.    J. METTLER    1,988,014
ELECTRICITY METER AND CONTROLLING MECHANISM THEREFOR
Filed Aug. 2, 1927
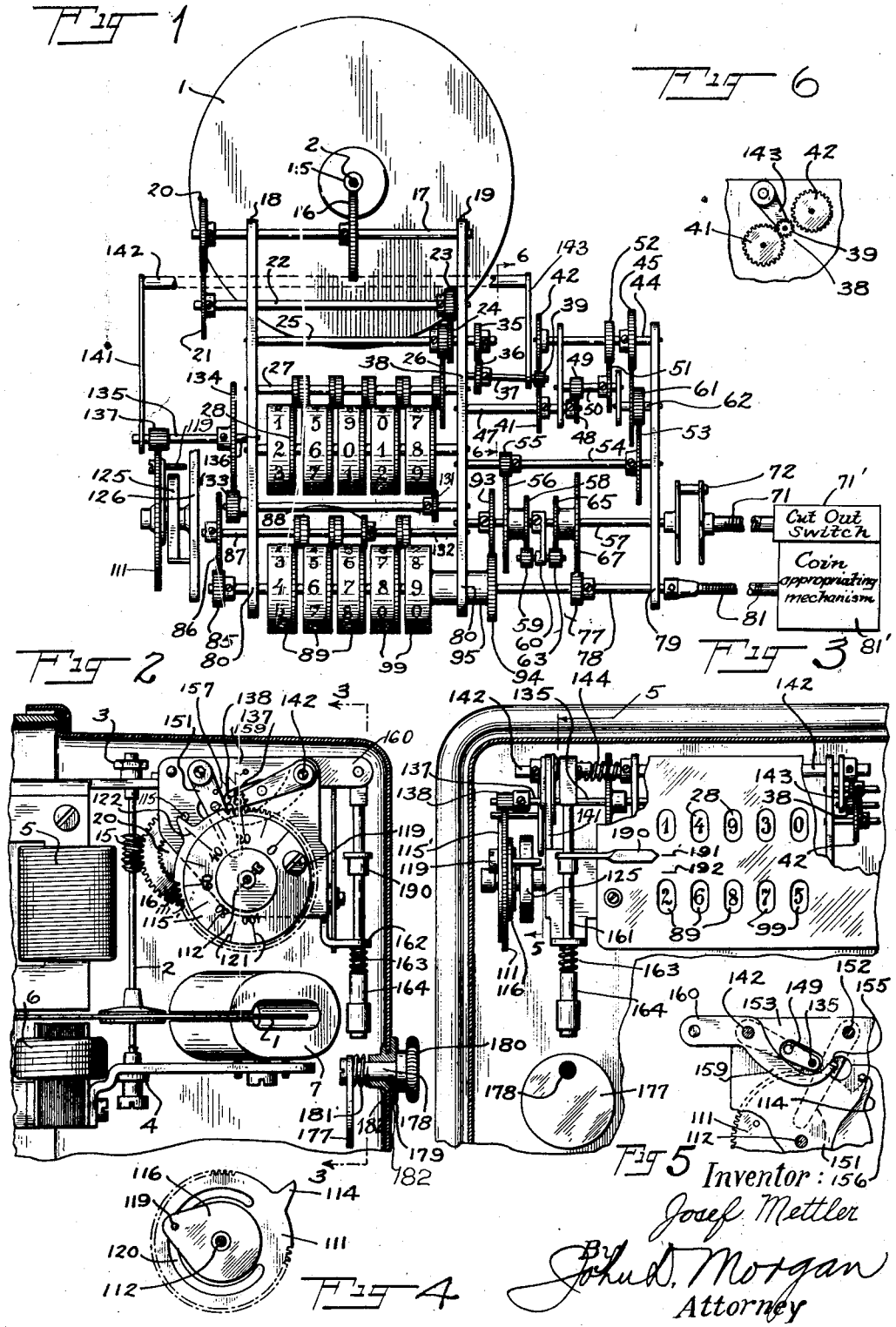
Inventor: Josef Mettler
By John D. Morgan
Attorney Patented Jan. 15, 1935

1,988,014

UNITED STATES PATENT OFFICE 1,988,014

ELECTRICITY METER AND CONTROLLING MECHANISM THEREFOR

Josef Mettler, Zug, Switzerland, assignor to Landis & Gyr, A.-G., a limited joint-stock company of Switzerland Application August 2, 1927, Serial No. 210,098 In Switzerland August 7, 1926

11 Claims. (Cl. 194—11)

The invention relates to electricity meters, and in certain of its features more particularly to prepayment meters whereby registration of the energy consumption is made on the basis of a scaled or variable tariff schedule, although in certain aspects of the invention it is of more general application.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Fig. 1 is a somewhat diagrammatic showing of the mechanism which is extended and has some parts omitted for the sake of clearness;

Fig. 2 is a fragmentary elevation with the casing in section, of a meter embodying the invention, looking at Fig. 1 from the right but showing the parts of the mechanism in different and more compact positions and including parts omitted from Fig. 1;

Fig. 3 is an elevation with the casing in section, substantially on the line 3—3 of Fig. 2, but with certain parts omitted;

Fig. 4 is a detached detailed view of parts of the settable limiting and shifting device for changing from one rate to another;

Fig. 5 is a fragmentary detail, taken substantially on the line 5—5 of Fig. 3; and Fig. 6 is a detached fragmentary detail, taken substantially on the line 6—6 of Fig. 1 but showing the mechanism in a different scale and relation.

The invention is directed to mechanism incorporated in or cooperating with a meter of usual or other suitable type, whereby after a variably predeterminable amount of energy is consumed, the amount of energy procurable on a fixed predetermined basis is automatically changed to another such basis for the remainder of a prearranged time period. For example, in the application of the invention to a coin-controlled meter, after the sequential recognition and appropriation of a predetermined number of coins and the delivery of the corresponding amount of energy, the relation of the meter to the coin-controlled mechanism is automatically changed so that upon the further sequential recognition and appropriation of coins by the coin-controlled mechanism the meter will deliver a predetermined greater amount of energy per coin recognized or appropriated during the remainder of a predetermined time period or until the mechanism is reset. In other words, the energy consumption rate in proportion to the coins deposited beyond a certain amount is automatically increased during the remainder of the time period.

The present embodiment, in its broader aspects, comprises a metering mechanism, and a connected registering device of standard type, and in connection therewith a coin-control mechanism whereby current is made available and metered at one initial or preliminary rate, against a given amount of coins taken by the mechanism, and after a corresponding, but variably predeterminable amount of energy is consumed, the mechanism automatically changes the relation between the meter and the coin-controlled mechanism, whereby further energy consumption, usually to an indefinite amount during a prearranged time period is obtained at a lower rate with respect to the coins deposited and sequentially recognized by the coin-controlled mechanism. In this embodiment, the mechanism is shown adapted to only two tariff rates, although it is obvious that it could be adapted to three or more rate changes if desired.

In this embodiment, a settable limiting and stopping mechanism is provided which may be preliminarily set for a definite amount of energy consumption, and gearing or like connections is provided therefrom to the meter and to the coin-controlled mechanism, whereby the energy consumption is maintained at a predetermined initial rate, and after the energy consumption has reached the so predetermined set amount the limiting and stopping mechanism is disconnected from the meter, the ratio of the gearing or like connections to the coin-controlled mechanism to the meter is changed so that thereafter the amount of energy delivered against the recognition and appropriation of a given coin is increased.

It will be understood that the foregoing general description and the following detailed description as well are illustrative and exemplary of the invention but are not restrictive thereof.

Referring now in detail to the embodiment of the invention illustrated by way of example in the accompanying drawing, a meter disc 1 is mounted on a shaft 2, having bearings 3 and 4 in the meter structure, there being voltage coils 5 and current coils 6 cooperating with the meter disc in the usual manner. A magnetic brake 7 is also provided, which may be of any known or suitable form. The mechanism so far as described is of known form, and this may be varied as desired.

In the embodied form of connections from the meter spindle to the registering mechanism, a worm 15 is fixed on the meter spindle 2, and a worm-wheel 16 meshes therewith, the worm-wheel being fixed on a shaft 17, journaled at 18 and 19 in the frame structure. Fixed on shaft 17 is a gear-wheel 20, meshing with a gear 21 fixed on a shaft 22 likewise journaled in the frame structure. A pinion 23 is fixed on shaft 22, and meshes with a compound pinion 24 fixed on a shaft 25, likewise journaled in the frame. Meshing with the pinion 24 is a gear 26, fixed on a shaft 27, journaled in the machine frame, the shaft 27 having gear connections to the register 28, which may be of any known or other suitable form.

Referring now to the mechanism for variably controlling the amount of energy delivered against coins recognized and appropriated, or any other prepayment-effecting means, a variably settable energy-measuring and limiting mechanism is provided and in cooperation therewith a gear ratio-changing or equivalent mechanism controlled thereby; the settable energy-measuring and limiting mechanism, and the gear ratio mechanism being connected both to the meter and to the coin-controlled mechanism. Referring primarily to the gear ratio changing mechanism, and the connections to the coin-controlled mechanism, a gear 35 is fixed on shaft 25, and is in mesh with a gear 36, fixed near one end of a shaft 37, which shaft is mounted at 38 in the frame structure so as to be laterally swingable. Near the outer end of shaft 37 is fixed a pinion 39, which by said swinging movement of the shaft passes alternatively into mesh with a gear-wheel 41 or a gear-wheel 42.

Gear-wheel 42 is fixed on a shaft 44, journaled in the machine frame, and fixed on shaft 44 also is a gear-wheel 45. Gear-wheel 41 is fixed on a shaft 47, journaled in the frame and fixed also on said shaft is a gear 48. Gear 48 meshes with a pinion 49, fixed on a shaft 50. Fixed also on shaft 50 is a gear 51, which meshes with a gear-wheel 52, also fixed on shaft 44, but of different diameter from gear-wheel 45 fixed on said shaft. Therefore, gear-wheel 45 has imparted thereto different speeds relatively to the motor speeds depending on whether the pinion 39 is in mesh with gear-wheel 41 of gear-wheel 42, and the speed relation of the meter to the coin-controlled mechanism is correspondingly changed.

The further connections to the stop-mechanism and coin-controlled mechanism as embodied comprises also means for varying the relation between the coin-controlled mechanism and devices for indicating the status of the appropriation of coins by the machine and the number of deposited coins still unappropriated by the machine, said embodiment comprises a compound gear-wheel 61 fixed on a shaft 62, journaled in the machine frame, said gear-wheel meshing with a gear-wheel 53, fixed on a shaft 54, likewise journaled in the frame. Fixed on shaft 54 is a pinion 55, which meshes with one sun-wheel 56 of a planetary gear mechanism, the wheel 56 being mounted loosely on a shaft 57, journaled in the frame structure. Fixed to gear-wheel 56 is a gear-wheel 58, which meshes with a planetary pinion 59 which is fixed on a shaft journaled at the outer end of an arm 60, which arm is fixed on the shaft 57. The other pinion 63 of the planetary gear is also fixed on the same shaft with pinion 59 and is in mesh with a gear-wheel 65 loosely mounted on the shaft 57. Fixed to gear-wheel 65 is a sun-gear 67 of the planetary, likewise loose on the shaft. Shaft 57 is rotatively connected both to the cut out switch of the coin-controlled mechanism and also to a coin residue indicating device, as will be later described.

The shaft 71 of the cut out switch mechanism of any known or suitable form of coin-controlled device shown diagrammatically at 71' is connected with shaft 57 by a suitable clutch or other connection 72. In mesh with gear-wheel 67 is a pinion 77, fixed on a shaft 78, extending across the mechanism, and journaled at 79 and 80 in the opposite side frames. A flexible shaft 81 is rotatively connected with the shaft 77 and also with sequentially operating coin recognizing and appropriating mechanism shown diagrammatically at 81' of the coin-controlled device. This mechanism is of the type shown in my prior Patent No. 1,670,592, to which reference may be made for the details of construction. In the present embodiment the shafts 71 and 81 correspond to the shafts 31 and 14, respectively, of my said prior patent.

In the connections indicating the number of coins already appropriated and also the rate of coin appropriation, there is fixed to shaft 78, a pinion 85, which meshes with a gear-wheel 86, fixed on a shaft 87, journaled in the machine structure, and having a gear connection 88 to a register 89, which indicates the number of coins appropriated in the coin-controlled mechanism, for the energy consumed. In the connections from shaft 57 to the mechanism for indicating the number of coins deposited but still unused, there is fixed on shaft 57 a gear-wheel 93, which meshes with a gear-wheel 94, fixed on a sleeve 95. This is journaled loosely on the shaft 78, the sleeve also being connected to the mechanism 99, which indicates the number of coins in the coin-controlled mechanism which are still available for purchasing energy. The gear-wheel 93 thus rotates with the arm 60 of the planetary gear mechanism, while the pinion 77 rotates with the gear-wheel 67, the speed of these two being independent of each other.

Referring now to the embodied form of predeterminably settable energy limiting and stopping mechanism, a settable and limiting gear-wheel or toothed disc 111 is mounted loosely on a stud 112 projecting from the frame structure. The teeth on 111 are interrupted, and at one point in its circumference it is provided with a stop-tooth 114 which is adapted to engage with a pin 115, fixed on the frame to limit the rotation of the disc 111 in one direction. A circular disc 115' is likewise loosely mounted on the stud 112, just outside the toothed disc 111, which operatively considered is its initial position. Just behind toothed disc 111 is a disc 116, and the discs 111 and 116 are connected to rotate together, by a screw 119 or other suitable fastening device. Screw 119 extends through a long, concentric, arcuate slot 120, formed in the toothed disc 111. On the outer face of the disc 115' is a scale 121, indicating energy consumption units, and cooperating therewith is a suitable mark 122 on the tooth disc 111. Screw 119 projects rearwardly from disc 116 and constitutes a tripping device for some of the controls for the limiting and stopping device.

Means are provided for impelling the toothed disc 111 back to initial position, while permitting it to be driven from the meter in fixed relation to the energy consumption during the predetermined first energy-consuming period, and as embodied a spiral spring mechanism 125 is employed, one end being fixed to the toothed disc 111 and other to the frame plate 126 of the mechanism.

In the embodied form, gear connections from the register are provided for driving the toothed disc 111 in ratio to the meter, and for disconnecting it from the meter, by shifting the pinion 39, at the end of the predetermined amount of energy consumption for which the limiting mechanism has been set, so as to give the customer the benefit of the lower rate for any further coins deposited. As embodied, it comprises driving connections from the meter register to shiftable pinion 137, later described. Accordingly, a pinion 131 is in mesh with one of the gears of the meter register, this pinion being fixed on a shaft 132, journaled in the frame structure. A pinion 133 is fixed on the protruding end of shaft 132 and meshes with a gear-wheel 134, fixed on a shaft 135. One end of shaft 135 is swingably journaled at 136 in the frame structure, so that the shaft may be swung laterally in connecting and disconnecting the meter and the limiting mechanism. Fixed on shaft 135 is a pinion 137 adapted to pass into and out of mesh with the toothed disc 111 of the limiting and stopping device.

For the purpose of throwing the pinion 137 in and out and for simultaneously shifting pinion 39, the outer end of shaft 135 is embraced by the slotted end of a lever 141, which is fixed to a shaft 142, rockably journaled in the frame structure, and extending across to the other side thereof. A pin 149 is fixed on lever 141, and projects through an opening in the frame plate (Fig. 5) into the path of a lever 159, whereby the latter lever can move the former, as later described. A spring 144 acts on shaft 142 to press pinion 137 resiliently to the toothed disc 111. Fixed also to shaft 142 is an arm 143 having a slotted end, which embraces the swingable shaft 37, carrying the pinion 39, which, as you will recall, is shiftable into mesh alternatively with the gear-wheel 41 and the gear-wheel 42. Thus it will be seen that the pinion 39 and the pinion 137 are simultaneously shiftable, the former to change the drive ratio between the meter and the coin controlled mechanism, and the latter to drive the limiting and stopping mechanism in ratio with the metering device, or to release said mechanism at the end of the first or high-rate energy consumption period, whereby it is permitted to return to initial position and is inactive during the second energy metering period.

Referring now to the embodied means for disconnecting the meter and the limiting and stopping mechanism after the first predetermined amount of energy has been consumed, an arm 151 is pivoted at 152 upon the supporting plate 153 of the frame structure, this arm projecting downwardly into the path of pin 119, which, as will be recalled, was variably positionable and settable in the arcuate slot 120 of the toothed disc 111, to vary the limiting of the amount of energy consumed at the high tariff rate. Fixed in the arm 151 is a pin 155, projecting inwardly through an opening 156 in the plate 153. The opening 156 constitutes a limiting means for the movement of the arm 151, and the arm is resiliently held to one side of the opening by a spring 157. The pin 155 has a flat face, against which bears one end of the lever 159, which lever is loosely mounted on the shaft 142. The other end 160 of this lever is pivotally connected to a longitudinally-slidable rod 161, sliding in an apertured guide-way 162, fixed on the frame. A helical compressing spring 163 between the guide 162 and a collar 164 on the rod impels the rod downwardly and the lever 159, 160 in the counterclockwise direction in Fig. 5, and tends to press the arm 159 against its stop pin 155 on swingable lever 151.

During the operation of the device, as later described, the rod 161 is moved downwardly at the end of the first tariff period, and remains in this position during the running of the meter on the later and reduced tariff. Means are provided whereby the meter may be reset at the end of this later tariff period and brought back again to the beginning of the first or higher rate tariff at the end of the week or month or other prearranged or other time limit for such resetting. In the embodied form of such means an eccentric 177 is fixed on a shaft 178, mounted in a bushing 179 in the meter casing. Shaft 178 is provided with a hand knob 180, the shaft and its knob being rotatable and longitudinally slidable in the bushing 179. A coil spring 181 presses the shaft inwardly, and a locking pin 182 projects into the corresponding recess in the bushing 179. When the meter is to be reset, to begin again on the first or high tariff period, the attendant pulls the knob 180 outwardly, thereby disengaging the locking pin 182 and rotates the knob and therewith the eccentric 177, thereby lifting the rod 161, which allows the pinion 137 to move into mesh with the toothed-disc 111, thereby again starting the cycle of the limiting and stopping device. The knob 180 will be protected from unauthorized manipulation by any sealing or locking device or other suitable means.

The manner of operation of the hereinbefore-described mechanism will be clear from the foregoing, but may be summarized as follows:

The amount of energy to be metered under the higher tariff, or otherwise during the first block or stage is predetermined by setting the readings on the disc 115' for this predetermined energy amount in connection with the mark 122 on the toothed disc 111, and thereby the stop pin 119 is positioned in the slot 120 correspondingly, discs 111, 115' and 116 rotating together, and driven from the meter by pinion 137. At this time the pinion 137 is in mesh with a toothed disc 111, and the pinion is driven by the registering mechanism. Pinion 39 is in mesh with gear-wheel 41, and is driving at the higher ratio with respect to the meter disc. The coin-controlled mechanism is operating at this same ratio with respect to the meter, and the toothed disc 111 and its associated parts are likewise rotating proportionately to the meter and moving in the counterclockwise direction in Fig. 2.

This continues until stop pin 119 engages with lever 151, and moves it in the clockwise direction in Fig. 2 (counter-clockwise in Fig. 5), until the pin 155 is moved away from the end of the lever 159. Thereupon lever 159 swings in the clockwise direction in Fig. 2 (counter-clockwise in Fig. 5), and engages with the pin 149 on lever 141, which is thereby rocked, lifting pinion 137 out of mesh with the toothed disc 111, the disc 111 and the associated parts of the limiting and stopping mechanism immediately returning to initial position with the tooth 114 against the stop pin 115 under the influence of spring 125.

When lever 141 is rocked, lever 143 is rocked therewith and pinion 39 is moved out of mesh with gear-wheel 41 and into mesh with gear-wheel 42, and the gear-train up to the differential mechanism is then run at the slower speed corresponding to the later and usually lower tariff rate for the remainder of the prearranged time period or until the rod 161 is reset. The change in the gear ratio by the shifting of pinion 39 effects a different ratio of rotation between the shafts 71 and 81 of the coin-controlled mechanism, thereby effecting a slower appropriation or passing of the coins relatively to the meter speed.

When it is desired to again place the meter on the limited consumption block, or higher tariff, the knob 180 is actuated to lift the rod 161, thereby swinging lever 159, 160 in the counter-clockwise direction in Fig. 2 (clockwise in Fig. 5), and pinion 137 is brought by spring 144 into mesh with the toothed disc 111, and the disc and associated parts are moved in the manner already described by the drive from the meter through the registering device. At the same time the pinion 39 is moved back into mesh with the gear 41 and the higher ratio between the cut out switch shaft 71 and the shaft 81 of the coin-appropriating mechanism is established. During this rocking of the lever 159, 160 (Figs. 2 and 5) the curved end thereof snaps back to locking position under the pin 155, as shown in Fig. 5, and remains there, maintaining the mechanism in the operating position for the first energy-consuming block, as already described, until the pin 119 strikes the lever 151, when the predetermined energy consumption measurement has been reached, and the shift is again made, as already described.

A device is provided for indicating on which energy block the meter is operating, and for this purpose a pointer 190 is fixed on rod 161, and when the rod moves or is moved, the finger passes from one indicating mark 191 or 192 to the other. The coin actuating mechanism 71' is rotated in one direction in the usual manner by the insertion of coins and the turning of the usual coin knob, and is rotated in the opposite direction as energy is consumed and measured by the meter. As is usual with this type of mechanism, the initial rotation of the knob closes a snap switch which is thereafter maintained in closed position until an amount of energy equivalent to the value of the deposited coins has been metered. After consumption of this amount of energy, the switch is opened. The flexible shaft 81, connected with the cut-out switch 81', serves to release as well as set the mechanism holding the switch in closed position, in the usual manner.

The invention has been exemplified in connection with a meter governed by a coin controlled prepayment mechanism, but it will be obvious that the invention has other applications wherein two or more successive stages of energy consumption can be placed on a different basis with respect to any other known or suitable controlling mechanism; the purpose and operation of the mechanism being broadly to meter and control energy consumption on successive blocks of predetermined amounts of energy.

The invention in its broader aspects is not limited to the specific mechanisms shown and described but departures may be made therefrom within the scope of the accompanying claims without departing from the principles of the invention and without sacrificing its chief advantages.

What I claim is:—

1. An electricity metering mechanism and control therefor including in combination a meter, a controlling mechanism, a settable device operated by said meter, connections controlled thereby to operate after the metering of a predetermined quantity of energy, for changing the speed relation of the meter to the controlling mechanism and switch operating mechanism controlled by said controlling mechanism.

2. An electricity metering mechanism and control therefor including in combination a meter, a controlling mechanism and a settable device operated by said meter, connections for changing the speed relation of the meter to the controlling mechanism, means operating with the settable device for disconnecting said settable device after a predetermined energy consumption and switch operating mechanism controlled by said controlling mechanism.

3. An electricity metering mechanism and control therefor including in combination a meter, a controlling mechanism and a settable device operated by said meter, connections controlled thereby to operate after the metering of a predetermined quantity of energy for changing the speed relation of the meter to the controlling mechanism, means operating with the settable device for disconnecting said settable device after a predetermined energy consumption and switch operating mechanism controlled by said controlling mechanism.

4. An electricity metering mechanism and control therefor including in combination a meter, and a controlling device therefor having a cut-out switch controlling mechanism and a settable tariff controlling device, connections for varying the relation of the cut-out switch controlling mechanism and tariff controlling device after the consumption of the amount of energy for which the settable device was set.

5. An electricity metering device and control therefor including in combination a meter, a controlling device therefor having a cut-out switch controlling mechanism and a settable tariff controlling device, connections for varying the relation of the cut-out switch mechanism and tariff controlling device after the consumption of the amount of energy for which the settable device was set, and means for disconnecting the settable device after the consumption of said amount of energy.

6. An electricity metering device and control therefor including in combination a meter and a cooperating coin controlled mechanism having a cut-out switch controlling device operated by said meter and a coin appropriating device, and said controlling device including connections operating after the consumption of a predetermined quantity of energy for changing the relation of the switch controlling device to the coin appropriating device and manual means for restoring said connections to their original position.

7. An electricity metering device and control therefor including a meter, a coin appropriating mechanism and a cut out switch controlled thereby, a register, driving means therefor having relatively different speeds and alternatively driven by said meter and controlling the cut out switch, means for changing the drive from one driving means to the other and changing the rate of coin appropriation after the consumption of a predetermined amount of energy.

8. In a coin-controlled electricity meter having a coin appropriating mechanism and a cut out switch, the combination of a register, a plurality of register driving means alternatively driven by the meter, a shiftable gear, means actuated by the meter for moving the gear to drive one of the driving means and means for restoring the gear to its normal position to drive another driving means.

9. In a coin-controlled meter having a coin appropriating mechanism and a cut out switch, the combination of a register, a plurality of register driving means driven by the meter, a shiftable gear, means actuated by the meter for moving the gear for alternatively driving one of the driving means, means for restoring the gear to its normal position to drive the other driving means, and means for connecting either driving means with the coin controlled mechanism and cut out switch to drive the coin controlled mechanism proportionally to the rate of actuation of the driven means.

10. An electricity metering mechanism adapted to be coin controlled for operating a cut out switch including an energy meter, a switch operating member, and means for controlling said member by said meter including a plurality of gear trains, means for alternatively driving either of said trains from said meter and resettable means operated by said meter for changing the drive from one to the other after consumption of a predetermined amount of energy as measured by said meter.

11. An electricity metering mechanism adapted to be coin controlled for operating a cut out switch including an energy meter, a switch opening member and means for controlling said member by said meter including a plurality of gear trains driven by said meter for alternatively driving said member at different rates, a shiftable pinion, means for manually connecting said pinion with one train and meter controlled means for connecting said pinion with another train after measurement of a variable, predetermined amount of energy by said meter.

JOSEF METTLER.